(12) United States Patent
Liang et al.

(10) Patent No.: US 12,224,908 B2
(45) Date of Patent: Feb. 11, 2025

(54) BANDWIDTH ADJUSTMENT AND CORRECTION METHOD, APPARATUS AND DEVICE, AND STORAGE MEDIUM

(71) Applicant: ZTE Corporation, Shenzhen (CN)

(72) Inventors: Shuang Liang, Shenzhen (CN); Jinyang Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 190 days.

(21) Appl. No.: 17/775,091

(22) PCT Filed: Nov. 23, 2020

(86) PCT No.: PCT/CN2020/130830
§ 371 (c)(1),
(2) Date: May 6, 2022

(87) PCT Pub. No.: WO2021/129272
PCT Pub. Date: Jul. 1, 2021

(65) Prior Publication Data
US 2022/0400059 A1 Dec. 15, 2022

(30) Foreign Application Priority Data
Dec. 27, 2019 (CN) .......................... 201911379458.1

(51) Int. Cl.
*H04L 41/0896* (2022.01)
*H04L 43/0876* (2022.01)
(Continued)

(52) U.S. Cl.
CPC ...... *H04L 41/0896* (2013.01); *H04L 43/0876* (2013.01); *H04L 45/125* (2013.01);
(Continued)

(58) Field of Classification Search
None
See application file for complete search history.

(56) References Cited

U.S. PATENT DOCUMENTS 6,216,006 B1 * 4/2001 Scholefield ........... H04L 47/283
455/452.2
6,564,258 B1 * 5/2003 Uniacke .................. H04L 45/02
709/224

(Continued)

FOREIGN PATENT DOCUMENTS

| CN | 101414971 A | 4/2009 |
|---|---|---|
| CN | 101729379 A | 6/2010 |

(Continued)

OTHER PUBLICATIONS

International Searching Authority. International Search Report and Written Opinion for PCT Application No. PCT/CN2020/130830 and English translation, mailed Feb. 19, 2021, pp. 1-10.

(Continued)

*Primary Examiner* — Benjamin Lamont
(74) *Attorney, Agent, or Firm* — Vivacqua Crane, PLLC

(57) ABSTRACT

A bandwidth adjustment and correction method, apparatus and device, and a non-transitory computer-readable storage medium are disclosed. The method may include, acquiring an enabling state of a connection admission control (CAC) of a preset path in response to an increase in a bandwidth of service of the preset path; acquiring a bandwidth carried by a tunnel layer where the preset path is presented in response to a state in which the CAC is enabled; determining a target route that matches the service of the preset path according to an adjusted bandwidth and a preset route policy of the preset path in response to an overrun in the bandwidth carried by the tunnel layer; and adjusting the preset path to the target route in response to a presence of the target route.

12 Claims, 3 Drawing Sheets

(51) Int. Cl.
  *H04L 45/125* (2022.01)
  *H04L 45/302* (2022.01)
  *H04L 47/726* (2022.01)
  *H04L 47/70* (2022.01)

(52) U.S. Cl.
  CPC .......... *H04L 45/302* (2013.01); *H04L 47/728* (2013.01); *H04L 47/70* (2013.01); *H04L 47/825* (2013.01)

(56) References Cited

U.S. PATENT DOCUMENTS

| | | | | |
|---|---|---|---|---|
| 6,738,819 | B1* | 5/2004 | Li | H04L 47/70 709/227 |
| 6,791,941 | B1 | 9/2004 | Dziong et al. | |
| 6,842,463 | B1* | 1/2005 | Drwiega | H04L 45/123 370/468 |
| 2002/0028679 | A1* | 3/2002 | Edwards | H04W 28/20 455/452.2 |
| 2005/0276218 | A1* | 12/2005 | Ooghe | H04L 47/822 370/229 |
| 2011/0188374 | A1* | 8/2011 | Zhou | H04L 47/827 370/231 |
| 2015/0180791 | A1 | 6/2015 | Bentley et al. | |
| 2021/0051523 | A1* | 2/2021 | Bedekar | H04W 28/16 |

FOREIGN PATENT DOCUMENTS

| | | |
|---|---|---|
| CN | 104869032 A | 8/2015 |
| CN | 105553843 A | 5/2016 |
| CN | 106330526 A | 1/2017 |
| WO | 2019238101 A1 | 12/2019 |

OTHER PUBLICATIONS

The State Intellectual Property Office of People's Republic of China. First Office Action and Search Report for CN Application No. 2019113794581 and English translation, mailed Aug. 28, 2023, pp. 1-13.

Lu, Y., et al. "Policy based QoS management technology and its application in broadband services" and English translation, Telecommunications Network Technology, vol. 08, 2005, pp. 1-6.

The State Intellectual Property Office of People's Republic of China. Second Office Action for CN Application No. 201911379458.1 and English translation, mailed Mar. 3, 2024, pp. 1-11.

The State Intellectual Property Office of People's Republic of China. Supplemental Search Report for CN Application No. 201911379458.1 and English translation, mailed Feb. 29, 2024, pp. 1-5.

The State Intellectual Property Office of People's Republic of China. Decision of Reexamination for CN Application No. 201911379458.1 and English translation, mailed Oct. 16, 2024, pp. 1-2.

The State Intellectual Property Office of People's Republic of China. Third Office Action for CN Application No. 201911379458.1 and English translation, mailed Nov. 6, 2024, pp. 1-18.

* cited by examiner

S204: Determine whether the bandwidth of a tunnel is sufficient for adjustment according to adjusted bandwidth;

S207: Determine whether the route calculation is successful;

S210: Determine whether the acquired user's feedback information indicates satisfactory of the user.

BANDWIDTH ADJUSTMENT AND CORRECTION METHOD, APPARATUS AND DEVICE, AND STORAGE MEDIUM

CROSS-REFERENCE TO RELATED APPLICATION

This application is a national stage filing under 35 U.S.C. § 371 of international application number PCT/CN2020/130830, filed Nov. 23, 2020, which claims priority to Chinese patent application No. 201911379458.1, filed Dec. 27, 2019. The contents of these applications are incorporated herein by reference in their entirety.

TECHNICAL FIELD

The present disclosure relates to the technical field of communication, and in particular, to a bandwidth adjustment and correction method, apparatus and a device, and a non-transitory computer-readable storage medium.

BACKGROUND

In an operating network, a situation where a service bandwidth of a path in the network is adjusted often occurs. Once the bandwidth configuration exceeds a limit, a service may be lost. When that happens, operation and maintenance personnel has to perform troubleshooting segment by segment according to the alarm and service flow direction of the operating network, and then perform a manual recovery. However, troubleshooting and service recovery take a long time and require a heavy workload.

SUMMARY

An embodiment of the present disclosure provides a bandwidth adjustment and correction method, which may include, acquiring an enabling state of a connection admission control (CAC) of a preset path in response to an increase in a bandwidth of service of the preset path; acquiring a bandwidth carried by a tunnel layer where the preset path is presented in response to a state in which the CAC is enabled; determining a target route that matches the service of the preset path according to an adjusted bandwidth and a preset route policy of the preset path in response to an overrun in the bandwidth carried by the tunnel layer; and adjusting the preset path to the target route in response to a presence of the target route.

An embodiment of the present disclosure provides a bandwidth adjustment and correction device, which may include, a CAC state acquisition module configured to acquire an enabling state of a connection admission control (CAC) of a preset path in response to an increase in a bandwidth of service of the preset path; a tunnel bandwidth acquisition module configured to acquire a bandwidth carried by a tunnel layer where the preset path is presented in response to a state in which the CAC is enabled; a target route determination module configured to determine a target route that matches the service of the preset path according to an adjusted bandwidth and a preset route policy of the preset path in response to an overrun in the bandwidth carried by the tunnel layer; and a preset path adjustment module configured to adjust the preset path to the target route in response to a presence of the target route.

An embodiment of the present disclosure provides an apparatus, which may include a processor and a memory storing a program which, when executed by the processor, causes the processor to carry out any one of the methods in the embodiments of the present disclosure.

An embodiment of the present disclosure provides a non-transitory computer-readable storage medium having a computer program stored thereon which, when executed by a processor, causes the processor to carry out any one of the methods in embodiments of the present disclosure.

DETAILED DESCRIPTION

In order to make the objectives, technical schemes and advantages of the present disclosure clearer, embodiments of the present disclosure will be described in detail with reference to the accompanying drawings. It should be noted that the embodiments in the present disclosure and the features in the embodiments may be combined with each other at random if not conflicted.

In some cases, how to avoid the service loss caused by the overrun of the adjusted bandwidth in advance has become a serious problem for telecom carriers.

In view of this, the present disclosure provides a bandwidth adjustment and correction method, apparatus and device, and a non-transitory computer-readable storage medium, to solve the problem of long time consumption and heavy workload for manual troubleshooting and service recovery after service loss.

Figure 1:
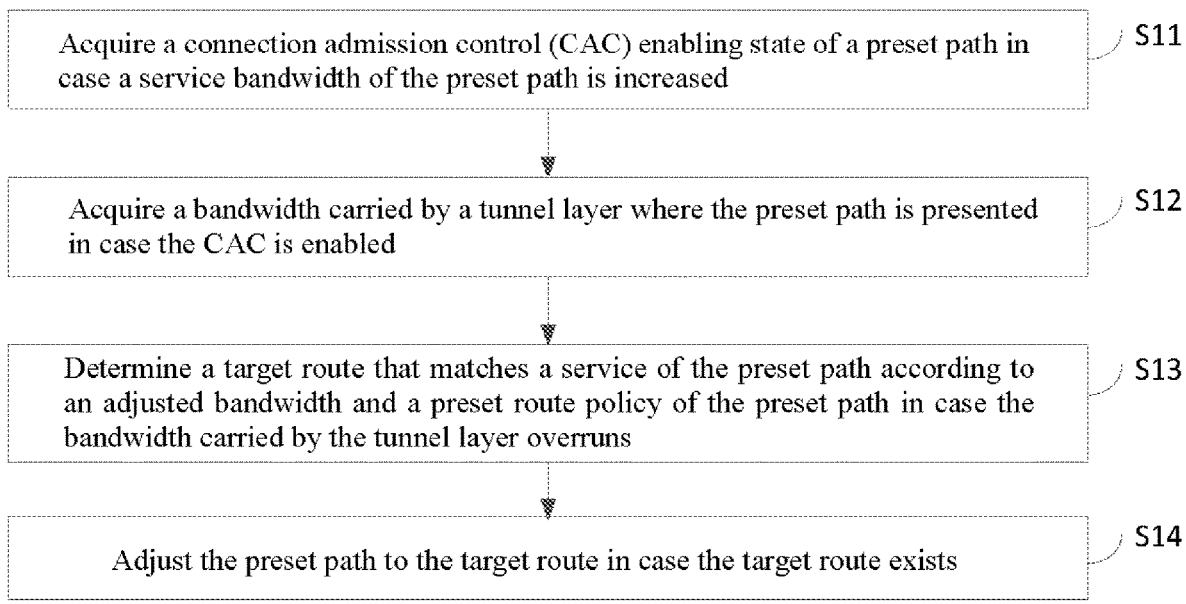
FIG. 1 depicts a flowchart of a bandwidth adjustment and correction method.

FIG. 1 shows a bandwidth adjustment and correction method according to an embodiment of the present disclosure. The method includes the following S11 to S14.

At S11, a connection admission control (CAC) enabling state of a preset path is acquired in case a service bandwidth of the preset path is increased.

At S12, a bandwidth carried by a tunnel layer where the preset path is presented is acquired in case the CAC is enabled.

At S13, a target route that matches a service of the preset path is determined according to an adjusted bandwidth and a preset route policy of the preset path in case the bandwidth carried by the tunnel layer overruns.

At S14, the preset path is adjusted to the target route in case the target route exists.

When a bandwidth of a preset path is adjusted via a network management platform, if the bandwidth of the preset path is increased, it is necessary to determine whether the increased bandwidth exceed the carrying capacity of a tunnel. A network server acquires an adjusted bandwidth for the bandwidth of the preset path and determines whether CAC is enabled. In case the CAC is enabled, it is determined whether the bandwidth overruns. By querying a routing table of the preset path and a QoS bandwidth table, the bandwidth is calculated and whether the bandwidth overruns is determined, that is, whether the sum of all bandwidths of the tunnel layer where the preset path is presented, is within the carrying capacity of the tunnel layer. If the bandwidth overruns, it is necessary to adjust a route of the preset path to find a target route that matches a service of the preset path.

Paths that meet the adjusted bandwidth, and requirements of different users for operating pseudo wires and protection pseudo wires may be different, so a user may choose different route protection policies for overrun paths with different priorities, and a preset route policy may refer to a route policy specified by the user. The target route should be the one that satisfies the adjusted bandwidth and hits the preset route policy. When a route that meets the user's expectation and has a sufficient bandwidth is successfully calculated as the target route, the route is provided to the user to adjust the preset path. Therefore, in the case where the user excessively adjusts the bandwidth of the preset path, the overrun bandwidth service may be automatically identified, and the adjusted service route may be automatically provided, to ensure to the greatest extent that once bandwidth overrun occurs, all paths may be immediately adjusted to a new route to avoid service loss. Meanwhile, there is no need for operation and maintenance personnel to check and correct a large number of paths in the operating network one by one. Thus, paths in which bandwidth overrun of the whole network are effectively reduced, the reliability of paths of the whole network is improved, the difficulty of operation and maintenance is reduced, and the workload of operation and maintenance is reduced.

In an implementation, after the connection admission control (CAC) enabling state of a preset path is acquired, the bandwidth adjustment and correction method further includes returning of notification of sufficient bandwidth in case the CAC is disenabled.

In an implementation, after the target route matching the service according to the adjusted bandwidth and the preset route policy of the preset path is determined, the bandwidth adjustment and correction method further includes the following.

In case the target route does not exist, returning information about the cause of route matching failure. In case the calculation of the target route fails, a specific cause of the failure of the route calculation is fed back to a user, for example, no route that meets the adjusted bandwidth exists, or the specified policies of the user for the operating pseudo wires and the protection pseudo wires cannot be met. The user may reconstruct the operating network according to the cause of matching failure.

In an implementation, the adjustment of the preset path to the target route in case the target route exists includes the following.

Adjusting the preset path to the target route with a minimum number of hops in case a plurality of target routes exist.

In case the network management server selects a route policy specified by the user according to the service priority, and calculates at least two routes with sufficient bandwidth, a route with the minimum number of hops is selected as the preset route for route adjustment. In an implementation, the adjustment of the preset path to the target route in case the target route exists includes the following.

Returning attribute information about a plurality of target routes in case the plurality of target routes exist.

And adjusting the preset path to the target route selected by a user according to the acquired user selection operation.

In case the network management server selects a route policy specified by the user according to the service priority, and calculates at least two routes with sufficient bandwidth, these target routes may be fed back to the user in addition to the default selection of the route with the minimum number of hops as the preset route for route adjustment, and the route is adjusted for the preset path according to one of the target routes selected by the user.

In an implementation, before the connection admission control (CAC) enabling state of the preset path is acquired in case the service bandwidth of the preset path is increased, the bandwidth adjustment and correction method further includes the following.

Adding a CAC parameter to quality-of-service (QoS) parameters.

The network management platform may download a bandwidth parameter when modifying an Ethernet service, but does not download a CAC parameter. If no CAC parameter exists, the bandwidth of the tunnel would not be considered during the calculation of the route. Therefore, it is necessary to complete the CAC parameter for modifying the Ethernet service on the network management platform.

Accordingly, the determination of the target route that matches the service of the preset path according to the adjusted bandwidth and the preset route policy of the preset path in case the bandwidth carried by the tunnel layer overruns includes the following.

Recursively determining whether the bandwidth of tunnel layer is sufficient to carry the adjusted bandwidth according to the adjusted bandwidth.

And calculating the target route according to the QoS parameters in case the bandwidth of the tunnel layer is insufficient to carry the adjusted bandwidth.

Determination is performed as to whether the bandwidth of a tunnel is sufficient for the adjustment according to the adjusted bandwidth. In particular, determination is performed as to whether the bandwidth of the tunnel is sufficient for the adjustment by the recursive determination on the bandwidth of the operating pseudo wire and the protection pseudo wire. A pseudo wire bandwidth is adjusted via a previous command code for a previous adjustment of the pseudo wire bandwidth in case the bandwidth is sufficient for the current adjustment. The route is calculated via new QoS parameters in case the bandwidth of the tunnel is insufficient for the current adjustment.

Example

Figure 2:
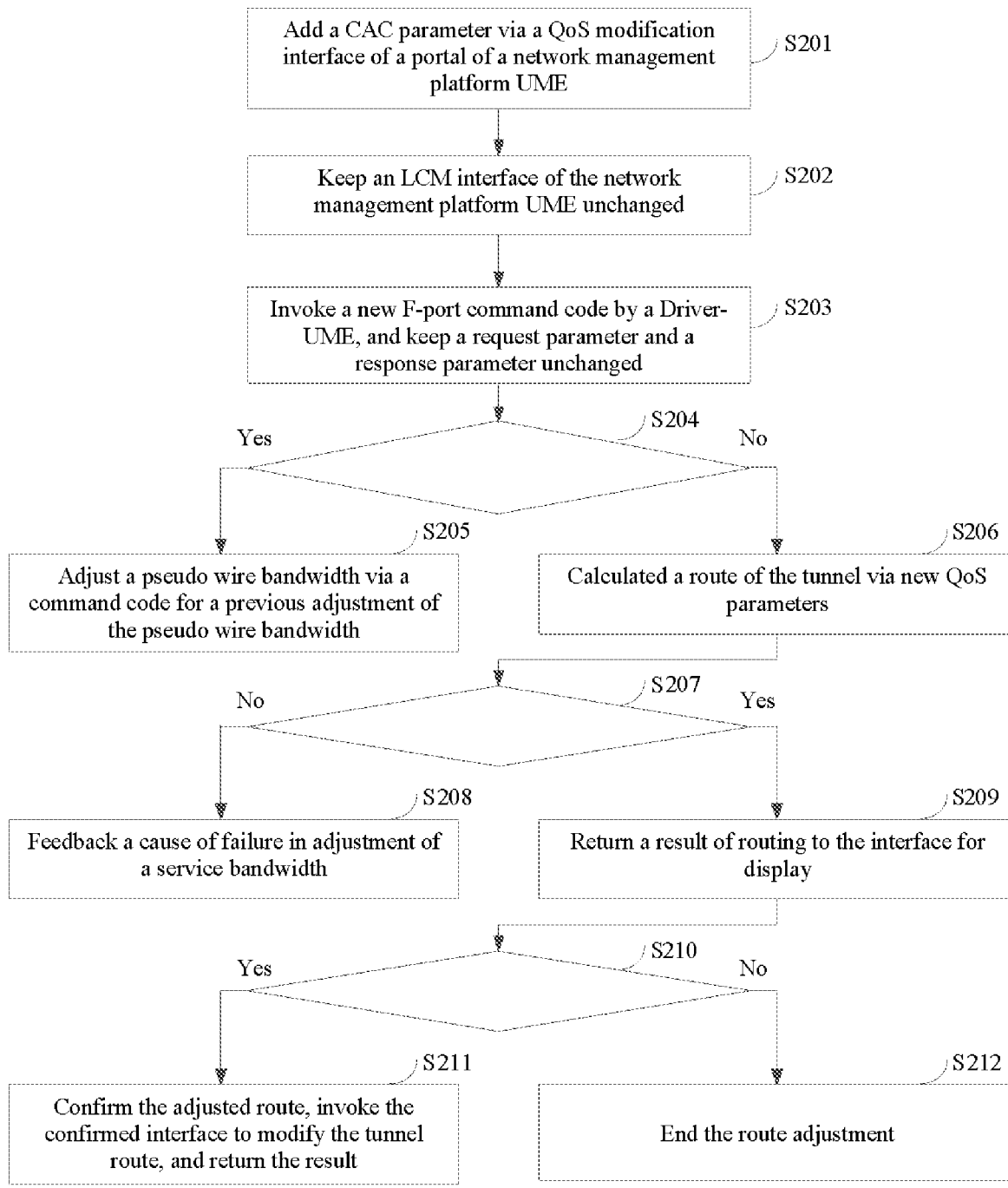
FIG. 2 depicts a flowchart of a bandwidth adjustment and correction method.

FIG. 2 shows a bandwidth adjustment and correction method, which includes S201 to S212.

At S201, a CAC parameter is added via a QoS modification interface of a portal of a network management platform UME.

At S202, an interface of the network management platform UME is kept unchanged.

The interface is a conversion interface connecting the client and the network server, which can directly transmit commands without any modification.

At S203, a new F-port command code is invoked by a Driver-UME, and a request parameter and a response parameter are kept unchanged.

At S204, a determination as to whether a bandwidth of a tunnel is sufficient for the adjustment is performed according to the adjusted bandwidth.

In case the bandwidth is sufficient for the adjustment, step S205 is performed; or in case the bandwidth is insufficient for the adjustment, step S206 is performed.

At S205, a pseudo wire bandwidth is adjusted via a command code for a previous adjustment of the pseudo wire bandwidth.

At S206, a route of the tunnel is calculated via new QoS parameters.

At S207, a determination as to whether route calculation is successful is performed.

In case the route calculation fails, step S208 is performed; or in case the route calculation is successful, step S209 is performed.

At S208, a cause of failure in the adjustment of a service bandwidth is fed back, to prompt that current bandwidth adjustment fails.

At S209, a result of routing is returned to the interface for display.

At S210, a determination as to whether the acquired user's feedback information indicates satisfactory of the user is performed.

In case the user is satisfied, confirmation information sent by the user is acquired, then step S211 is performed to confirm the adjusted route, the confirmed interface is invoked to modify the tunnel route, and the result is returned. In case the user is not satisfied, the information of abandoning the adjustment sent by the user is acquired, then step S212 is performed and the route adjustment is ended.

An identifier indicating whether the route is adjusted is added to the returned result, and prompt information is sent to the client: the current modification of the bandwidth parameter results in changes in the tunnel route. In case changes in the current route is prompted, the route is automatically queried once when switching to the "route" panel.

The configuration is ended.

By means of the above method, the route of the service after the excessive adjustment in bandwidth is automatically adjusted, and the adjusted result is visually presented to the user.

Figure 3:
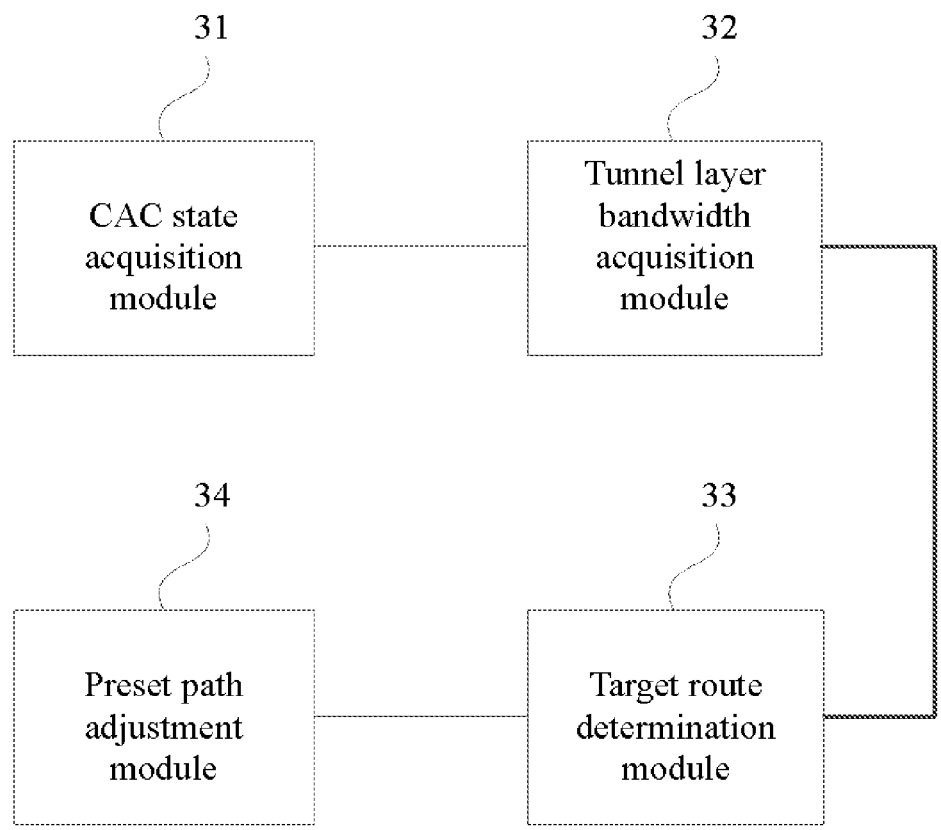
FIG. 3 depicts a schematic diagram of a bandwidth adjustment and correction device.
Figure 4:
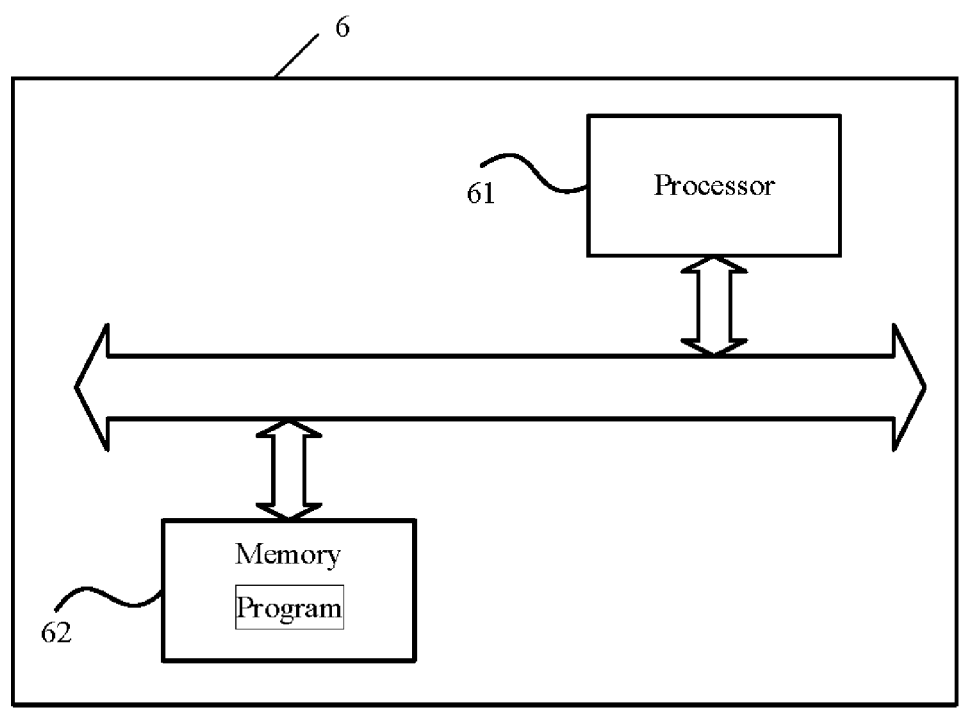
FIG. 4 depicts a block diagram of implementation of a bandwidth adjustment and correction apparatus.

FIG. 3 shows a bandwidth adjustment and correction device, which includes the following modules 31 to 34.

CAC state acquisition module 31, which is configured to acquire a connection admission control (CAC) enabling state of a preset path in case a service bandwidth of the preset path is increased.

Tunnel layer bandwidth acquisition module 32, which is configured to acquire a bandwidth carried by a tunnel layer where the preset path is presented in case CAC is enabled;

Target route determination module 33, which is configured to determine a target route that matches a service of the preset path according to an adjusted bandwidth and a preset route policy of the preset path in case the bandwidth carried by the tunnel layer overruns.

Preset path adjustment module 34, which is configured to adjust the preset path to the target route in case the target route exists.

In an implementation, the bandwidth adjustment and correction device further includes the following module.

Bandwidth-sufficient notification module, which is configured to return a notification of sufficient bandwidth in case the CAC is disenabled after the connection admission control (CAC) enabling state of the preset path is acquired.

In an implementation, the bandwidth adjustment and correction device further includes the following module.

Matching failure feedback module, which is configured to return information about cause of route matching failure in case the target route does not exist after the target route of a matching service is determined according to the adjusted bandwidth and the preset route policy of the preset path.

In an implementation, the preset path adjustment module includes the following unit.

First adjustment unit, which is configured to adjust the preset path to the target route with a minimum number of hops in case a plurality of target routes exist.

In an implementation, the preset path adjustment module includes the following units.

Route information feedback unit, which is configured to return attribute information about the plurality of target routes in case a plurality of the target routes exist.

Second adjustment unit, which is configured to adjust the preset path to the target route selected by the user according to the acquired user selection operation.

In an implementation, the bandwidth adjustment and correction device further includes the following module.

CAC parameter adding module, which is configured to add a CAC parameter to quality-of-service (QoS) parameters before the connection admission control (CAC) enabling state of the preset path is acquired in case the service bandwidth of the preset path is increased.

Accordingly, the target route determination module includes the following units.

Bandwidth determination unit, which is configured to perform a recursive determination as to whether the bandwidth of the tunnel layer is sufficient to carry the adjusted bandwidth according to the adjusted bandwidth.

Target route calculation unit, which is configured to calculate the target route according to the QoS parameters in case the bandwidth of the tunnel layer is insufficient to carry the adjusted bandwidth.

An embodiment of the present disclosure provides an apparatus 6, which includes a processor 61 and a memory 62.

The processor 61 is configured to execute a program stored in the memory to carry out any one of the methods described in the embodiments of the present disclosure.

An embodiment of the present disclosure further provides a non-transitory computer-readable storage medium storing computer program thereon, where the computer program is configured to implement any one of the methods described in the embodiments of the present disclosure when being executed by the processor.

According to the bandwidth adjustment and correction method, apparatus and device, and the non-transitory computer-readable storage medium set forth in embodiments of the present disclosure, the route is adjusted for the preset path by determination as to whether the tunnel is capable of carrying the adjusted bandwidth, avoiding service loss caused by excessive bandwidth adjustment and reducing the workload of operation and maintenance personnel.

The embodiments described above are just some embodiments of the present disclosure and are not intended to limit the protection scope of the present disclosure.

It should be understood by a person having ordinary skills in the art that the term "user terminal" covers any suitable type of wireless user equipment, such as a mobile phone, a portable data processing device, a portable web browser or a vehicle-mounted mobile station.

In general, various embodiments of the present disclosure may be implemented in hardware or a special-purpose circuit, software, logic, or any combination thereof. For example, some aspects may be implemented in hardware, while other aspects may be implemented in firmware or software that may be executed by a controller, a microprocessor or another computing device, although the present disclosure is not limited thereto.

Embodiments of the present disclosure may be implemented by executing a computer program instruction by a data processor of a mobile apparatus, for example, in a processor entity, or by hardware, or by a combination of software and hardware. The computer program instruction may be an assembly instruction, an instruction set architecture (ISA) instruction, a machine instruction, a machine-related instruction, a microcode, a firmware instruction, state setting data, or a source code or an object code written in any combination of one or more programming languages.

The block diagrams of any logic flow in the drawings of the present disclosure may represent program steps, or may represent interconnected logic circuits, modules and functions, or may represent the combinations of program steps and logic circuits, modules and functions. The computer program may be stored in the memory. The memory may be of any type suitable for the local technical environment and may be implemented using any suitable data storage technology, such as but not limited to, a read-only memory (ROM), a random access memory (RAM), an optical memory device and system (a digital versatile disk (DVD) or a CD) and the like. The computer-readable medium may include a non-transitory non-transitory computer-readable storage medium. The data processor may be of any type suitable for the local technical environment, such as but not limited to a general-purpose computer, a special-purpose computer, a microprocessor, a digital signal processor (DSP), an application specific integrated circuit (ASIC), programmable logic device (FGPA) and a processor based on a multi-core processor architecture.

Detailed description of example embodiments of the present disclosure are provided hereinabove by way of illustrative and non-limiting examples. However, it will be apparent to a person having ordinary skills in the art that various modifications and adjustments of the above embodiments may be made without departing from the scope of the present invention in connection with the accompanying drawings and claims. Therefore, the proper scope of the present invention will be defined by the claims.

The invention claimed is:

1. A bandwidth adjustment and correction method, comprising,
   adding a connection admission control (CAC) parameter to quality-of-service (QoS) parameters;
   acquiring an enabling state of a CAC of a preset path in response to an increase in a bandwidth of service of the preset path;
   acquiring a bandwidth carried by a tunnel layer where the preset path is presented in response to a state in which the CAC is enabled;
   determining a target route that matches the service of the preset path according to an adjusted bandwidth and a preset route policy of the preset path in response to an overrun in the bandwidth carried by the tunnel layer; and
   adjusting the preset path to the target route in response to a presence of the target route; and
   determining the target route that matches the service of the preset path according to the adjusted bandwidth and the preset route policy of the preset path in response to the overrun in the bandwidth carried by the tunnel layer comprises:
   determining as to whether the bandwidth carried by the tunnel layer is sufficient for the bandwidth adjustment by performing a recursive determination on a bandwidth of an operating pseudo wire and a bandwidth of a protection pseudo wire;
   adjusting the bandwidth of the operating pseudo wire via a previous command code for a previous adjustment of the bandwidth of the protection pseudo wire in case the bandwidth carried by the tunnel layer is sufficient for a current adjustment; and
   calculating the target route via new QoS parameters in case the bandwidth carried by the tunnel layer is insufficient for the current adjustment.

2. The method of claim 1, wherein after the enabling state of the CAC of the preset path is acquired, the method further comprises,
   returning a notification of sufficient bandwidth in response to a state in which the CAC is disenabled.

3. The method of claim 1, wherein adjusting the preset path to the target route in response the presence of the target route comprises,
   adjusting the preset path to the target route with a minimum number of hops in response to a presence of a plurality of target routes.

4. The method of claim 1, wherein adjusting the preset path to the target route in response to the presence of the target route comprises,
   returning attribute information about a plurality of target routes in response to a presence of the plurality of target routes; and
   adjusting the preset path to the target route selected by a user according to a selection operation acquired from the user.

5. An apparatus, comprising a processor and a memory storing a program which, when executed by the processor, causes the processor to carry out a bandwidth adjustment and correction method, comprising,
   adding a connection admission control (CAC) parameter to quality-of-service (QoS) parameters;
   acquiring an enabling state of a CAC of a preset path in response to an increase in a bandwidth of service of the preset path;
   acquiring a bandwidth carried by a tunnel layer where the preset path is presented in response to a state in which the CAC is enabled;
   determining a target route that matches the service of the preset path according to an adjusted bandwidth and a preset route policy of the preset path in response to an overrun in the bandwidth carried by the tunnel layer; and
   adjusting the preset path to the target route in response to a presence of the target route; and
   determining the target route that matches the service of the preset path according to the adjusted bandwidth and the preset route policy of the preset path in response to the overrun in the bandwidth carried by the tunnel layer comprises:
   determining as to whether the bandwidth carried by the tunnel layer is sufficient for the bandwidth adjustment by performing a recursive determination on a bandwidth of an operating pseudo wire and a bandwidth of a protection pseudo wire;
   adjusting the bandwidth of the operating pseudo wire via a previous command code for a previous adjustment of the bandwidth of the protection pseudo wire in case the bandwidth carried by the tunnel layer is sufficient for a current adjustment; and
   calculating the target route via new QoS parameters in case the bandwidth carried by the tunnel layer is insufficient for the current adjustment.

6. The apparatus of claim 5, wherein after the enabling state of the CAC of the preset path is acquired, the method further comprises,
   returning a notification of sufficient bandwidth in response to a state in which the CAC is disenabled.

7. The apparatus of claim 5, wherein adjusting the preset path to the target route in response the presence of the target route comprises,
adjusting the preset path to the target route with a minimum number of hops in response to a presence of a plurality of target routes.

8. The apparatus of claim 5, wherein adjusting the preset path to the target route in response to the presence of the target route comprises,
returning attribute information about a plurality of target routes in response to a presence of the plurality of target routes; and
adjusting the preset path to the target route selected by a user according to a selection operation acquired from the user.

9. A non-transitory computer-readable storage medium, storing a computer program which, when executed by a processor, causes the processor to carry out a bandwidth adjustment and correction method, comprising,
adding a connection admission control (CAC) parameter to quality-of-service (QOS) parameters;
acquiring an enabling state of a CAC of a preset path in response to an increase in a bandwidth of service of the preset path;
acquiring a bandwidth carried by a tunnel layer where the preset path is presented in response to a state in which the CAC is enabled;
determining a target route that matches the service of the preset path according to an adjusted bandwidth and a preset route policy of the preset path in response to an overrun in the bandwidth carried by the tunnel layer; and
adjusting the preset path to the target route in response to a presence of the target route; and
determining the target route that matches the service of the preset path according to the adjusted bandwidth and the preset route policy of the preset path in response to the overrun in the bandwidth carried by the tunnel layer comprises:
determining as to whether the bandwidth carried by the tunnel layer is sufficient for the bandwidth adjustment by performing a recursive determination on a bandwidth of an operating pseudo wire and a bandwidth of a protection pseudo wire;
adjusting the bandwidth of the operating pseudo wire via a previous command code for a previous adjustment of the bandwidth of the protection pseudo wire in case the bandwidth carried by the tunnel layer is sufficient for a current adjustment; and
calculating the target route via new QoS parameters in case the bandwidth carried by the tunnel layer is insufficient for the current adjustment.

10. The non-transitory computer-readable storage medium of claim 9, wherein after the enabling state of the CAC of the preset path is acquired, the method further comprises,
returning a notification of sufficient bandwidth in response to a state in which the CAC is disenabled.

11. The non-transitory computer-readable storage medium of claim 9, wherein adjusting the preset path to the target route in response the presence of the target route comprises,
adjusting the preset path to the target route with a minimum number of hops in response to a presence of a plurality of target routes.

12. The non-transitory computer-readable storage medium of claim 9, wherein adjusting the preset path to the target route in response to the presence of the target route comprises,
returning attribute information about a plurality of target routes in response to a presence of the plurality of target routes; and
adjusting the preset path to the target route selected by a user according to a selection operation acquired from the user.

* * * * *